United States Patent
Root

[15] 3,658,123
[45] Apr. 25, 1972

[54] APPARATUS FOR CONTROLLING THE TEMPERATURE OF A HEAT EXCHANGE MEDIUM

[72] Inventor: Donald S. Root, 3830 South Cincinnati, Tulsa, Okla. 74105

[22] Filed: Oct. 19, 1970

[21] Appl. No.: 82,019

[52] U.S. Cl.................................................165/22, 165/45
[51] Int. Cl...............................................................F24f 3/00
[58] Field of Search.........................................165/22, 50, 45

[56] References Cited

UNITED STATES PATENTS 2,715,514  8/1955  Stair.........................................165/22

*Primary Examiner*—Charles Sukalo
*Attorney*—Head & Johnson

[57] ABSTRACT

An apparatus for controlling the temperature of a heat exchange medium in a reverse cycle heat pump system includes within a closed heat exchange medium recirculating path thermostatically controlled heater mount elements and heat rejection panels. The heat rejection panels are cooled by both air flow and evaporative water system which incorporates a header having elongated members which discharge coolant onto the heat exchange panels through a continuous slot whereby a water curtain is formed to completely wet the heat rejection panel surfaces. A storage reservoir can be utilized to conserve the energy of the heat exchange medium.

6 Claims, 5 Drawing Figures

INVENTOR.
DONALD S. ROOT
BY Head & Johnson
ATTORNEYS

INVENTOR.
DONALD S. ROOT
BY Head & Johnson
ATTORNEYS

INVENTOR.
DONALD S. ROOT

BY Head & Johnson

ATTORNEYS

3,658,123

APPARATUS FOR CONTROLLING THE TEMPERATURE OF A HEAT EXCHANGE MEDIUM

BACKGROUND OF THE INVENTION

This invention relates to a heating and cooling system; more particularly, it pertains to an apparatus for controlling the temperature of the heat exchange medium in a reverse cycle heat pump temperature control system.

Reverse cycle heat pumping systems have been widely used in large office buildings and in other installations where the heating and cooling requirements are of a sufficient magnitude to justify the expense of such a system. Although the reverse cycle heat pump system provides the ultimate temperature control of the individual zones when a liquid exchange medium is used as a source of heat transfer, the cost and complexity of the support system; that is the boilers, cooling towers, pumps, pumping controls and field assembly operations, excludes the use of such a system in small installations. It is therefore an object of this invention to present an apparatus for controlling the temperature of the heat exchange medium in a reverse cycle heat pump system wherein all heating and cooling equipment and associate controls are housed in a unitary preassembled enclosure package.

It is a further object of this invention to present an apparatus for controlling the temperature of a heat exchange medium in a reverse cycle heat pump temperature control system incorporating therein a storage reservoir which conserves the energy of the heat exchange medium.

It is still a further object of this invention to present an apparatus for controlling the temperature of a heat exchange medium in a reverse cycle heat pump temperature control system which incorporates therein a continuously flowing curtain of water wetting the entire surface of the heat exchange panels to obtain optimum heat transfer upon command.

SUMMARY OF THE INVENTION

Generally the control tower of this invention has vertically disposed therein heat rejection panels through which passes a stream heat exchange medium recirculated between and through the heat rejection panels and reverse cycle heat pumps. Thermostatically controlled heater elements disposed within the circulating path of the heat exchange medium heat the heat exchange medium upon command. The heat exchange panels are cooled by a curtain of coolant discharged thereover through a continuous slot in an evaporative system which is circulated over the heat panels by a thermostatically controlled circulating pump. The apparatus further includes a multiple speed fan for creating an air flow through the heat exchange panels for the cooling thereof.

DETAILED DESCRIPTION OF THE DRAWINGS

DETAILED DESCRIPTION OF THE PREFERRED EMBODIMENT

Figure 1:
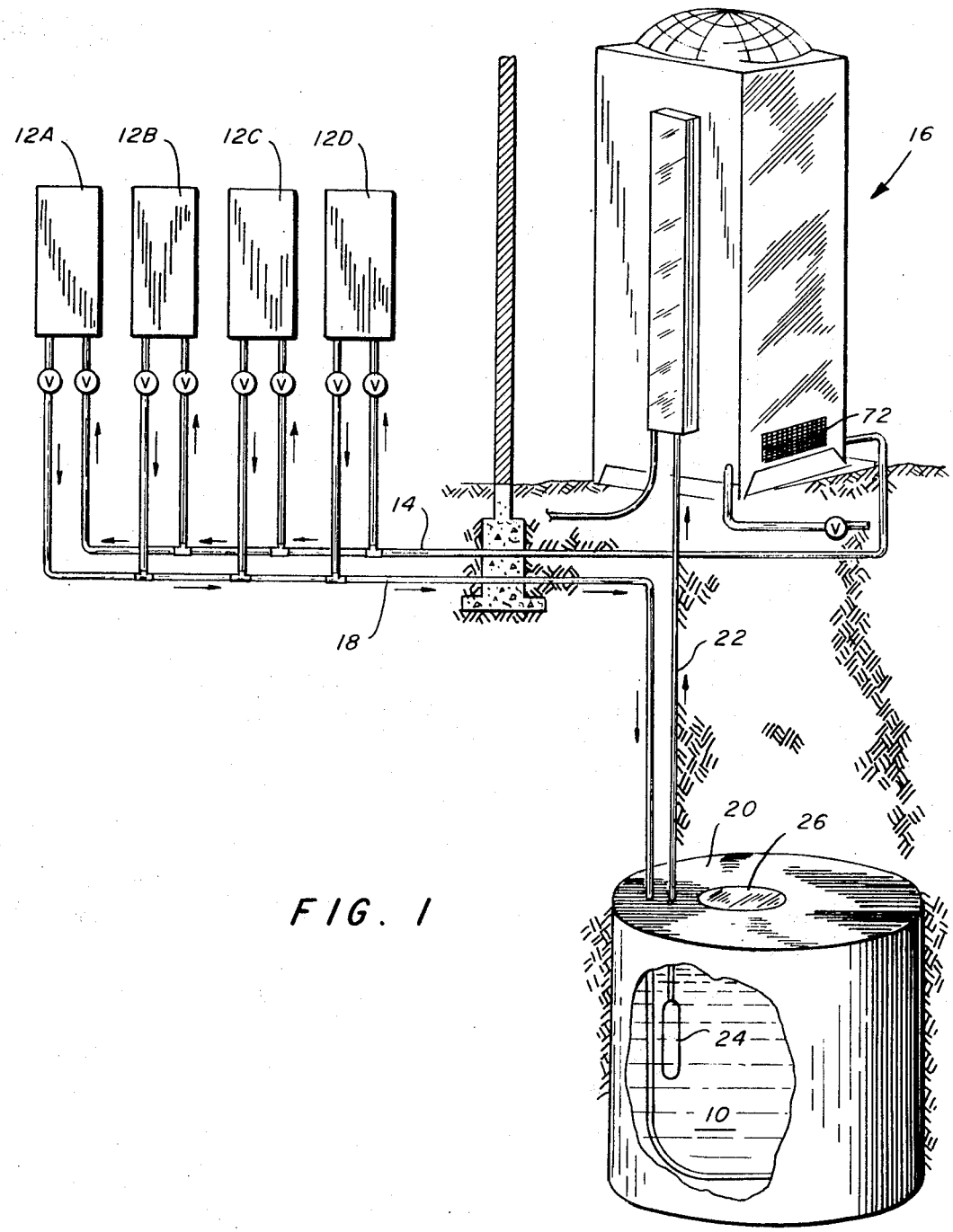
FIG. 1 is an overall view of a heating and cooling system employing the control apparatus of this invention.

Referring now to FIG. 1 of the drawings, independently operable reverse cycle heat pumping units 12A, 12B, 12C and 12D are installed in separate heat zones throughout a building or residence. The operation of a reverse cycle heat pump is well known in the art, and reference is hereby made to U.S. Pat. No. 2,715,514 issued to W. S. Stair, dated Aug. 16, 1955, for the construction operation of a reverse cycle heat pump.

Generally, a reverse cycle heat pump is a combination heating and cooling device which utilizes a recirculating liquid heat exchange medium 10 within a certain temperature range as both a heat and coolant source. Typically the heat exchange medium is water and the temperature range is 40° F to 100° F.

Liquid heat exchange medium 10 is conducted through each of the reverse cycle pumping units 12, through a feed conduit 14 from a control tower 16 where heat exchange medium 10 is either heated or cooled as required by the overall demand of the reverse cycle heat pumps. Control tower 16 is located adjacent the wall of the building above ground and is surrounded by outside ambient temperature.

After passing through a heating pumping unit, heat exchange medium 10 is discharged into a common return conduit 18. An ordinary single braid water hose of proper size can be used for the feed and return conduits 14 and 18, since the temperature requirements of the system require no particular insulation or protection as long as the environment is within the aforesaid temperature range of the system.

In some applications, a storage reservoir 20 may be utilized and is buried below ground in areas where the residual ground temperature is compatible with the temperature range of 40° F to 100° F. The reservoir location is not limited to below ground installation but may be located in any environment wherein the ambient temperature is within the temperature range of the system. Also additional heat sources, if available, can be carried through the reservoir to maintain the temperature range.

Heat exchange medium 10 is pumped from the storage reservoir to the intake of the control tower 16 through a conduit 22. If the pressure head of the system requires such, a submersible pump 24 can be located within the reservoir. An inspection hole 26 can be located on the top of the storage reservoir if desired.

Figure 2:
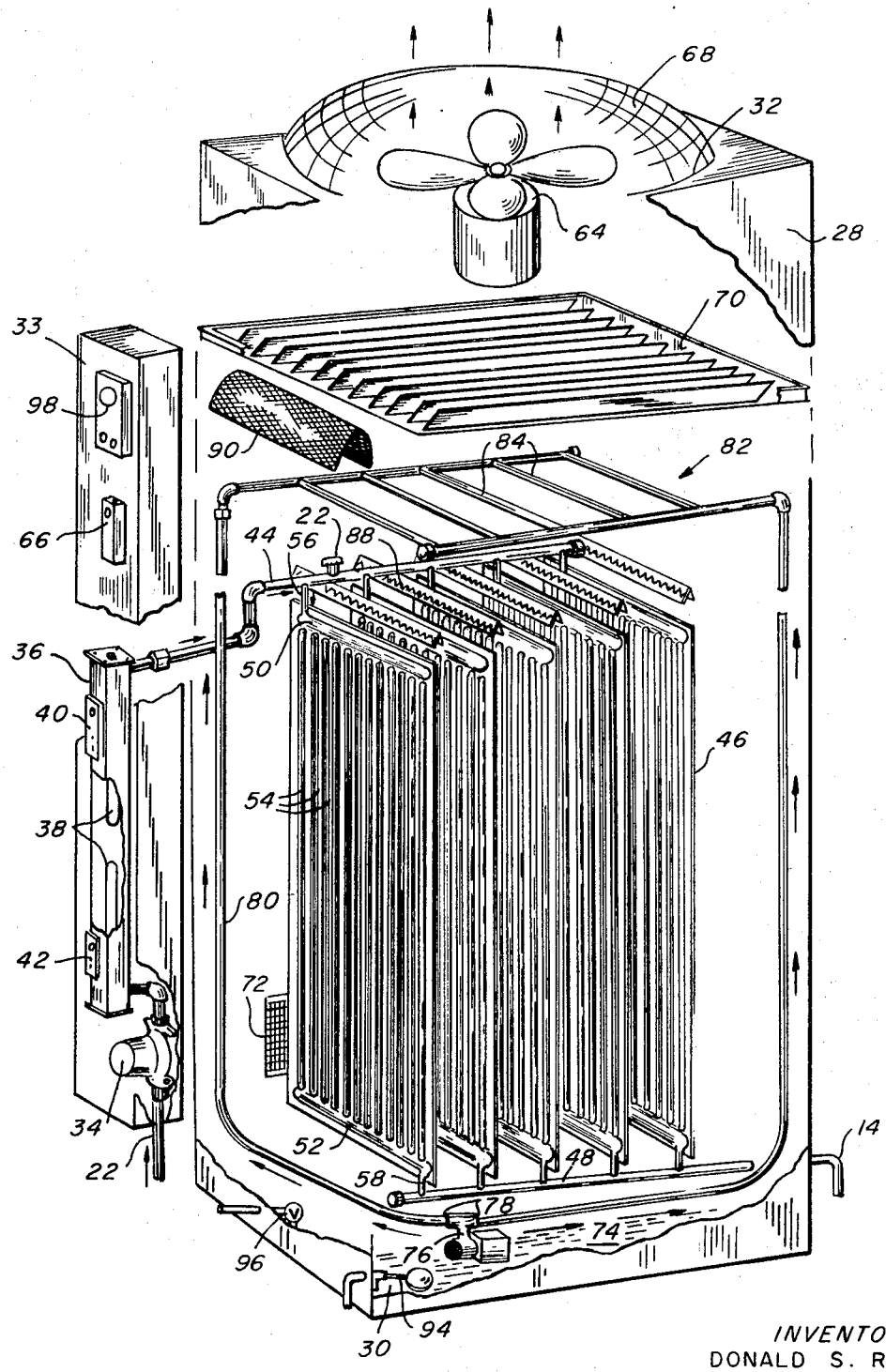
FIG. 2 is an exploded view of the heat exchange control tower of this invention.

Turning now to FIG. 2 of the drawings, there is shown an expanded view of the internal components of control tower 16. The purpose of the control tower is to stabilize the liquid heat exchange medium 10 at an operating point within the minimum 40° F and maximum 100° F of the system. Experiments have shown that a stabilizing temperature of 60° F accomplishes the desired heating and/or cooling requirements of the system.

Control tower 16 is housed by a four-sided enclosure 28, of suitable material, such as metal, plastic or fiberglass. The enclosure has a liquid-type sump pit 30, in the bottom thereof and an open top 32. Suitable insulation, such as Styrofoam, lines the inner walls of enclosure 28.

The inner port of a continuously circulating pump 34 is coupled to conduit 22 and operates continuously to circulate heat exchange medium 10 in the direction of the areas through a closed path between and through the control tower, the reverse cycle heat pumping units and the storage reservoir. Pump 34 is sized for the flow requirements and number of reverse cycle heat pumping units to be serviced. Fluidly coupled to the outlet port of pump 34 and secured to the outer wall of the enclosure 28 is an elongated full flow immersion chamber 36, the physical size of which is sufficient to encompass heater elements 38 and of a sufficient cross-sectional area to permit full transfer of heat from the heater element to liquid exchange medium 10. Dual electric type heating elements 38 are shown by way of example only, and are inserted at the upper and lower end of chamber 36. Each of the heater elements is independently controlled and and actuated at different temperatures by controllers 40 and 42 sensitive to the flow path of the exchange medium 10. Thus the heater elements are energized in stages and both elements will be energized simultaneously only when the average temperature of the heat exchange medium continues to drop below the preset operating temperature of the system. A high temperature cut-off contact is provided to de-energize the heater elements in the event that continuous circulating pump 34 should fail. A housing 33 secured to one of the walls of enclosure 28 provides protection from the elements for pump 34 and immersion chamber 36.

The outlet of heat chamber 36 feeds the inlet manifold 44 of a multiplicity of heat rejection panels 46 vertically disposed within the interior of the disclosure. Each of these panels provides multiple downwardly progressing fluid paths which converge into an outlet header 48 which in turn is coupled to and feeds conduit 14. Outlet header 48 is partially submerged in sump pit 30 and provides sufficient heat to prevent freezing of the sump coolant as will be discussed subsequently. Each of the panels is made of heat conductive material and has stamped therein or otherwise fabricated an upper subinlet header 50 and a lower suboutlet header 52 interconnected by a plurality of longitudinal heat paths 54. An inlet port 56 fluidly couples each panel to manifold 44 and an outlet port 58 couples each to outlet header 48. Inlet port 56 and outlet port 58 are positioned on each panel at diametrically opposite corners in order to equalize pressure, thereby assuring uniform heat exchange in each of the fluid paths 54. The necessary number of panels and of heat paths therein are determined by the capacity requirements of each particular installation.

Figure 4:
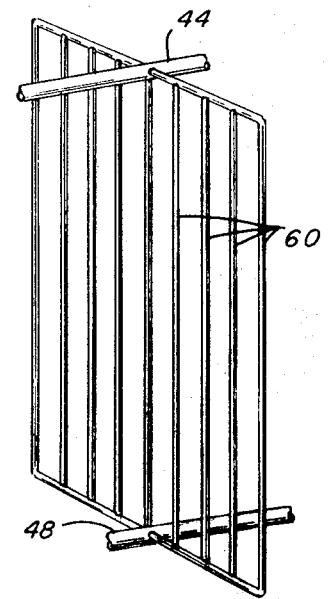
FIG. 4 shows an alternate heat rejection panel, an element of the apparatus of this invention.

Alternately, heat rejection panels 46 may be replaced by the tubular arrangement shown in FIG. 4. In this arrangement a plurality of parallel juxtaposed metallic tubes 60 such as copper tubes are fed by inlet manifold 44 and discharged into outlet header 48.

At the apex of inlet manifold 44 there is installed a pressure relief device 62 which, if desired, may comprise a pressurized cap covering an open port for introducing additional exchange medium into the system.

Differentially operated dual heat absorption systems are employed to cool upon demand exchange medium 10 during flow thereof through the heat rejection panels.

Forced air cooling is supplied by an electrical motor operated fan 64 mounted within an enclosure 28 upwardly of heat rejection panels 46. Fan 64 is thermostatically controlled by a first contact of a multiple stage temperature sequence controller 66 having the temperature bulb thereof suitably inserted in the heat exchange medium flow path. A mesh shroud 68 secured to top 32 of enclosure 28 permits air flow upwardly therethrough while providing protection from the fan blades. A horizontal air louver 70 received within enclosure 28 intermediate fan 64 and heat rejection panels 46 and air intake louvers 72 installed on two sides of the enclosure near the bottom thereof are opened by negative air pressure created by the rotation of the fan blades to provide an upwardly flowing stream of air around and over the heat rejection panels.

The second cooling system is of the evaporative water type. The bottom of the enclosure 28 as before mentioned includes a sump pit 30 in which is received a liquid sump coolant 74 such as water or a mixture of water and anti-freeze. A sump pump 76 has an inlet submerged in sump coolant 74 and an outlet port 78 which discharges sump coolant concurrently upwardly through dual supply conduits 80 to diametrically opposed ends of a distribution grid 82. The actuation of sump pump 76 is controlled by a second contact of temperature sequence controller 66.

Figure 3:
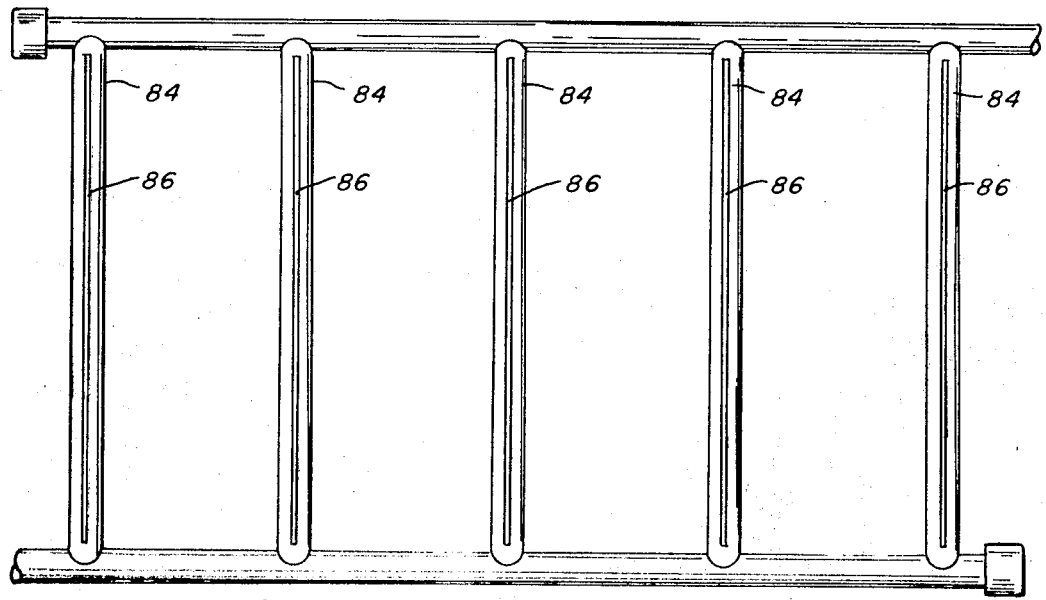
FIG. 3 is an underside view of a distribution grid, an element of the invention.
Figure 5:
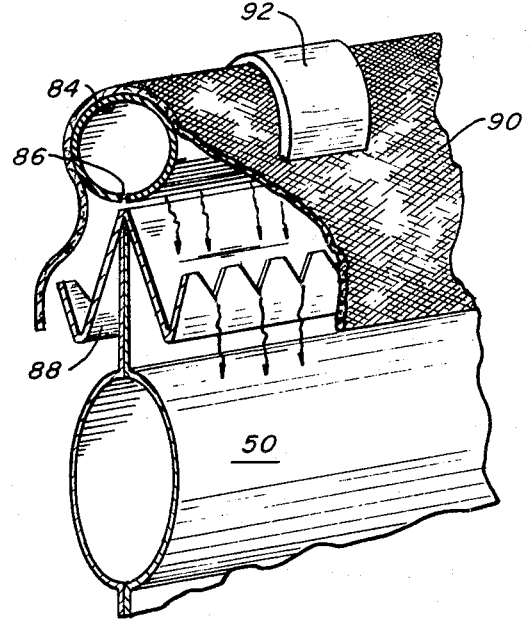
FIG. 5 is a partial view of the upper portion of a typical heat rejection panel showing the evaporative cooling portion of the apparatus.

Distribution grid 82 is composed of elongated plastic or PVC pipes 84 one each mounted directly over each of the heat rejection panels. As is shown in FIG. 3, each of the PVC pipes 84 has in the bottom thereof a continuous narrow longitudinal slot 86. Due to the surface tension thereof, a continuous curtain or stream of sump coolant is discharged through longitudinal slots 86 onto a splash pan 88. The width of continuous slot 86 is to be gauged in compliance with the design requirements of each installation. Splash pan 88 overlays the upper longitudinal edge of each of the panels which has outer serrated edges over which the sump coolant flows downwardly onto the panel. Referring now to FIG. 5 of the drawings, a fiberglass blanket 90 suitably attached to the PVC pipes by clamps 92 and jacketing both sides of splash pan 88 contains the sump coolant therebetween to assure that all of the liquid is directed onto the heat rejection panel. The coolant curtain completely wets the metallic surfaces of the heat rejection panel and gives more effective heat exchange than that provided by a spray-type evaporated coolant. Additionally considerable less coolant is used than in spray-type systems and there is no tendency for the water to follow the air.

Referring now back to FIG. 2, a float valve 94 is provided for maintaining a constant coolant level within the sump pit. Additionally there is also located in the sump pit an electrical solenoid dump valve 96. This dump valve is a combination overflow and discharge valve operated by an electrical solenoid valve electrically coupled to and actuated by a kind program sequence controller 98 suitably mounted in housing 33. This controller provides multiple time controller programming for other control uses and has one stage or contact preset to open and hold the dump valve for two or three minutes at preselected time periods; such periods being at intervals of up to two weeks. This holding action allows the float and filler valve to flush out contaminant from the sump pit and then return to standby position until the next program timing intervals. This sump dump overcomes a permanent cause of deterioration in evaporative systems by periodically ridding the sump pit of corrosive contaminants.

OPERATION OF DEVICE

Upon a call for heat in one of the zones such as that served by heat pump 12A, the heat pump will absorb a portion of the heat from the liquid exchange medium passing therethrough. Medium 10 then returns through conductor 16 to storage reservoir 20 at a lower temperature. The heat exchange medium 10 in the reservoir then rests for an extended period due to the large quantity of thermal energy in the reservoir with the liquid exchange medium giving up or absorbing heat with the surrounding environment which is as before mentioned selected to be within the operating range of the system. In some applications and in intermediate operating conditions, this heating and/or cooling transference may be sufficient to stabilize the temperature of the system.

Upon a demand for heating exceeding the total design capacity of the reservoir, the exchange medium temperature therein will drop and the liquid passing through continuous pump 34 into immersion chamber 36 will activate temperature controller 40 which in turn energizes one of the heater elements 38. If the temperature continues to fall, the second temperature controller 42 will energize the second heater element. The heating elements continue to operate until the entire reservoir has reached a minimum acceptable temperature. At this time the system will automatically be deactivated by temperature controllers 40 and 42.

The heat exchange medium continues to constantly circulate and upon demand from one of the heating zones, the heater elements will again be energized.

When the overall demand from the heating zones requires cooling, heat exchange medium 10 is returned to the reservoir at a higher temperature than that discharged from the control tower. After a preselected maximum temperature of the reservoir is reached, fan 64 is energized by a first contact on temperature controller 66 causing the passage of air upwardly over the heat rejection panels. If the temperature continues to rise for an extended period of time, the second contact on temperature controller 66 energizes sump pump 76 which as before mentioned causes the discharge of a coolant of water or other suitable liquid over heat panels 46. Both cooling systems concurrently operate until the temperature of the heat exchange medium in the entire system again falls within the preselected temperature range. At such a time, the fan and sump pump are deactivated and the system remains at rest except for a constantly circulating heat exchange medium. Obviously, if desired, the temperature sequence controller could be electrically wired to energize the wetted surface cooling system first and the dry air system second or other steps of cooling should be achieved.

As can be appreciated from the description, this invention is designed to contain in one unitized preassembled package all the functions performed by the typical dry-type cooling tower, evaporative cooling tower, liquid immersion heaters, circulating pumps, forced air passage, sump pumps, and heat rejection panels.

During the detailed description of the preferred embodiment specific language has been used for the sake of clarity. However, it is to be understood that the language used is for the sake of clarity and not by way of limitation. Such language includes all equivalents which operate in a similar manner to accomplish a similar purpose.

What is claimed:

1. In a heating and cooling system for buildings where a heat exchange medium is circulated through a plurality of independently operated reverse cycle heat pumping units, each unit having an inlet and an outlet for said heat exchange medium, an apparatus for operatively controlling the temperature of said heat exchange medium within a preselected temperature range comprising:

an outer enclosure having a bottom, a top and side, said bottom being leakproof to form a coolant sump;

at least one heat rejection panel disposed within said disclosures, each of said heat panels having an inlet for receiving said heat exchange medium from the outlet of said reverse cycle heat pump units and an outlet in fluid communication with the inlet of said reverse cycle heat pumping units whereby said heat exchange medium circulates in a closed path between and through said pumping units and said heat rejection panels;

a continuous operating pump for circulating said heat exchange medium in said closed system;

thermostatically controlled heating elements disposed in said closed heat exchange path and adapted to operatively heat said heat exchange medium;

an evaporative cooling system comprising:

an elongated member disposed within said enclosure directly above and parallel with the upper end of each of said heat exchange panels;

said elongated member having therein a continuous longitudinal slot in the underside thereof;

a pump disposed in said coolant sump in the bottom of said enclosure;

conduit means for fluidly connecting the outlet of said coolant pump with each of said elongated members whereby coolant within said sump is pumped into each elongated member and discharged therefrom through said slot in a continuous curtain onto said heat exchange panel.

2. An apparatus as in claim 1 wherein said elongated member of said coolant system is jacketed by a fiberglass blanket which contains said water therebetween.

3. An apparatus as in claim 1 including a splash pan disposed within said enclosure between and parallel with said elongated member and overlaying upper end of each of said rejection panels.

4. An apparatus as in claim 1 including a heat exchange medium storage reservoir disposed within said heat exchange medium circulating path; said heat exchange reservoir adapted to conserve the thermal energy of said heat exchange medium.

5. An apparatus as in claim 1 including fan means disposed upwardly of said evaporated coolant system and adapted to create a flow of air upwardly around said each of said heat rejection panels.

6. An apparatus as in claim 1 including an electrically solenoid operated dump valve disposed within said coolant reservoir and adopted to automatically flush said reservoir at preselected intervals.

* * * * *